(No Model.)
F. M. F. CAZIN.
PRODUCING MATRICES.
No. 402,720. Patented May 7, 1889.
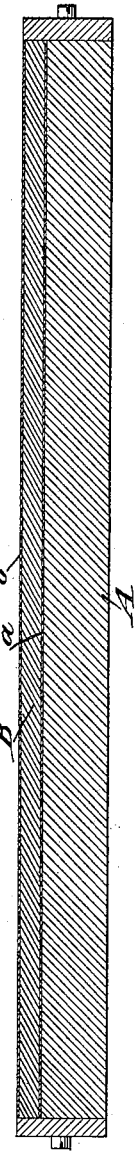
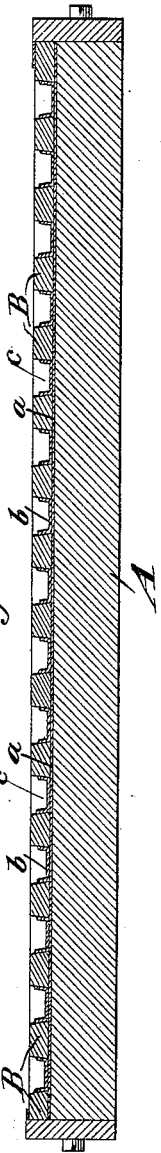
Witnesses
Inventor
Francis M. F. Cazin
by his attorneys

UNITED STATES PATENT OFFICE.

FRANCIS M. F. CAZIN, OF WEST FAIRLEE, VERMONT.

PRODUCING MATRICES.

SPECIFICATION forming part of Letters Patent No. 402,720, dated May 7, 1889.

Application filed December 1, 1886. Serial No. 220,358. (No model.)

*To all whom it may concern:*

Be it known that I, FRANCIS M. F. CAZIN, of West Fairlee, in the county of Orange and State of Vermont, have invented a certain new and useful Improvement in Matrices, of which the following is a specification.

My improvement relates to matrices for producing stereotype or electrotype plates.

I will describe a method for producing such matrices embodying my improvement in detail, and then point out the novel features in a claim.

In the accompanying drawings I have illustrated a matrix formed according to my improvement in connection with a bed or plate, upon which the same may be mounted. Figure 1 is a longitudinal section of the same, showing the first steps of the process. Fig. 2 is a similar view illustrating the completed matrix.

In carrying out my improvement I take a sheet or layer of any suitable plastic material—such, for instance, as papier-maché or wax, B. Upon opposite sides of the plastic material I place thin layers or sheets of tissue—such, for instance, as oiled paper, $a\ b$. The composite sheet is then subjected to the operation of dies, whereby it becomes impressed. During this operation the composite sheet will preferably be placed upon a base or plate, A. The dies for producing the impressions $c$ are such as will form letters or other characters employed in printing, and they may be operated by any suitable means.

By the use of the layer or sheet of tissue $a$ the removal of the completed matrix from the bed or plate A is facilitated, because such tissue prevents the matrix from adhering to the bed or plate. The layer or sheet $b$ serves to preserve a smooth surface upon the impression made by the dies, and also prevents the plastic material from adhering to the dies.

What I claim as my invention, and desire to secure by Letters Patent, is—

The process for making a matrix, consisting in first taking a sheet of plastic material, next placing thin tissue upon opposite sides of said sheet of plastic material, and, lastly, subjecting the composite sheet so formed to the action of dies, in order to form impressions therein, substantially as specified.

FRANCIS M. F. CAZIN.

Witnesses:
C. HALL,
FREDK. HAYNES.